United States Patent [19]

Loker et al.

[11] Patent Number: 5,306,051
[45] Date of Patent: Apr. 26, 1994

[54] SELF-ALIGNING AND SELF-TIGHTENING HOSE COUPLING AND METHOD THEREFOR

[75] Inventors: Ernest B. Loker, Edgewater; Karl E. Halfpap, Deale, both of Md.

[73] Assignee: Hydrasearch Co., Inc., Annapolis, Md.

[21] Appl. No.: 849,510

[22] Filed: Mar. 10, 1992

[51] Int. Cl.$^5$ ............................................. F16L 39/04
[52] U.S. Cl. ................................... 285/149; 285/253; 285/259
[58] Field of Search ............... 285/253, 243, 259, 256, 285/149

[56] References Cited

U.S. PATENT DOCUMENTS

| | | | |
|---|---|---|---|
| 787,529 | 4/1905 | Muehlberg | 285/259 X |
| 1,072,896 | 9/1913 | Albee | 285/259 X |
| 1,810,268 | 6/1931 | Dold | 285/149 X |
| 2,944,841 | 7/1960 | Carpenter | 285/243 |
| 3,222,091 | 12/1965 | Marshall | 285/243 X |
| 3,257,132 | 6/1966 | Lyons | 285/253 |
| 3,367,683 | 2/1968 | Mattson | 285/259 X |
| 3,495,855 | 2/1970 | Currie | 285/259 X |
| 4,212,487 | 7/1980 | Jones et al. | 285/243 X |
| 4,366,841 | 1/1983 | Currie et al. | 285/256 X |
| 4,369,992 | 1/1983 | Fournier et al. | 285/259 X |
| 4,486,035 | 12/1984 | Storke | 285/253 |
| 4,486,036 | 12/1984 | Storke | 285/253 |
| 4,564,222 | 1/1986 | Loker | 285/243 |
| 4,593,942 | 6/1986 | Loker | 285/253 |
| 4,684,157 | 8/1987 | Smith | 285/259 X |
| 4,758,029 | 7/1988 | Davis | 285/253 |

FOREIGN PATENT DOCUMENTS

| | | | |
|---|---|---|---|
| 28855 | 4/1925 | France | 285/259 |
| 8840 | of 1902 | United Kingdom | 285/253 |
| 3051 | of 1909 | United Kingdom | 285/253 |

Primary Examiner—Randolph A. Reese
Assistant Examiner—Heather Chun
Attorney, Agent, or Firm—Foley & Lardner

[57] ABSTRACT

A coupling and method of coupling of a self-aligning self-tightening nature is obtained by providing a nipple with a hose receiving end and a coupling end. An annular hose abutment flange directed outwardly is formed on the nipple remote from the hose receiving end. An annular pressure ramp is formed on the nipple intermediate the hose receiving end and the hose abutment flange. A plurality of grip segments having a hose receiving end and a coupling end are provided with at least one annular node and an inwardly directed alignment flange. A hose is slid over the hose receiving end of the nipple toward the abutment flange, and the grip segments are placed over the hose with the inwardly directed annular alignment flange located between the outward abutment flange and the coupling end of the nipple. The grip segments are tightened on the hose and nipple, thus forcing the grip segments toward the coupling end by squeezing the hose between the ramp and the node. It will be appreciated that under pressure or tension after the coupling is assembled, the nipple relationship between the hose and segments changes, causing increased hose retention, and again better tightening properties.

25 Claims, 3 Drawing Sheets

SELF-ALIGNING AND SELF-TIGHTENING HOSE COUPLING AND METHOD THEREFOR

BACKGROUND OF THE INVENTION

1. Field of the Invention

This invention relates to a self-aligning and self-tightening hose coupling and method therefor, and more particularly to a coupling for use with flexible hose or tubing.

2. Related Art

There is a large volume of prior art for coupling and securing various types of hoses. The hose coupling can be tightened into the hose wherein, by means of sufficient pressure, the hose coupling will exert sufficient force on the hose, deforming same, to create a tight seal between the hose and the article to which it is clamped. Essentially, it is the inner resilience of the hose against the nipple to which it is pressed which performs the sealing.

Nodes or the like often positioned on the nipple in combination with annular ridges on the coupling provide hose resistance causing the coupling from parting from the hose when subjected to internal pressure and/or external end loading.

The term "hose" and "tubing" used throughout the application are interchangeable and designate thin-walled flexible articles primarily of non-metallic material.

OBJECTS AND SUMMARY OF THE INVENTION

It is an object of the instant invention to provide a coupling which produces a good seal between the tubing and the article to which it is attached.

Another object is to provide reusable couplings which can be recoupled in the field and can be assembled with no special tools.

Still another object is to provide a coupling which can withstand relatively high pressures compared to its size.

A further object is to provide a self-tightening coupling which requires less initial torque, thus providing ease in assembly.

Yet another object is to provide a self-tightening coupling which will maintain its initial holding and sealing properties after normal cold flow of the hose material.

A further object is to provide a self-tightening coupling which will tighten with increase of hose internal pressure and/or external end load, and relax with decrease of hose internal pressure and external end load, thus providing the hose the potential of having a longer life when it is subjected to crimping loads proportional to service.

A further object is to provide a self-tightening coupling which will provide for the ultimate capabilities of the hose, i.e., the maximum theoretical strength of the hose.

A specific feature and object of the invention is to provide a coupling which has a nipple with a pressure ramp formed thereon for assisting in this self-tightening feature.

Specifically, a coupling and method of coupling of a self-aligning self-tightening nature is obtained by providing a nipple with a hose receiving end and a coupling end. An annular hose abutment flange directed outwardly is formed on the nipple remote from the hose receiving end. An annular pressure ramp is formed on the nipple intermediate the hose receiving end and the hose abutment flange. A plurality of grip segments having a hose receiving end and a coupling end are provided with at least one annular node and an inwardly directed alignment flange. A hose is slid over the hose receiving end of the nipple toward the abutment flange, and the grip segments are placed over the hose with the inwardly directed annular alignment flange located between the outward abutment flange and the coupling end of the nipple. The grip segments are tightened on the hose and nipple, thus forcing the grip segments toward the coupling end by squeezing the hose between the ramp and the node. It will be appreciated that under pressure or tension after the coupling is assembled, the nipple relationship between the hose and segments changes, causing increased hose retention, and again better tightening properties.

BRIEF DESCRIPTION OF THE DRAWINGS

The above and other objects and advantages of the invention will be appreciated from the following description and accompanying drawings, wherein.

DETAILED DESCRIPTION OF THE PREFERRED EMBODIMENTS

Figure 1:
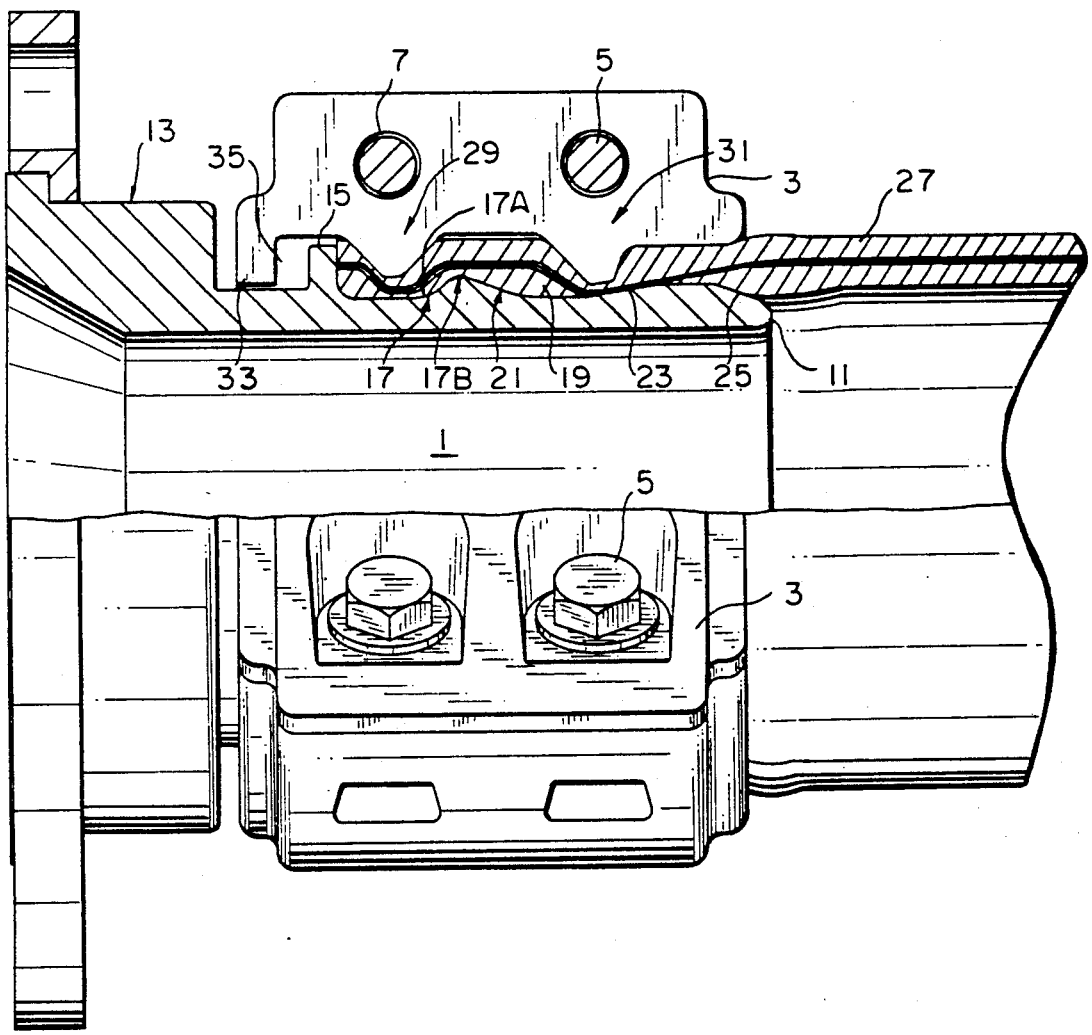
FIG. 1 is a side elevation view, partially in cross-section of an embodiment of the invention in a first position.

Referring to the drawings, a coupling is seen having a first inner nipple member 1, surrounded by a plurality of grip segments 3. The grip segments are bolted together by means of bolts 5 extending through openings 7 in the grip members and connected by means of nuts 9.

The nipple 1 has a hose receiving end 11 and a coupling end 13. An outwardly directed abutment flange 15 is formed on the nipple 1 at a point remote from the hose receiving end 11.

On the outer surface of the nipple 1 is a ramp 17 suitable to assure forward motion of the grip segment assembly during tightening for effective self seeking its proper location on the ramp. The ramp has an angle of about 45° formed by two radii which are created by blending the pair of radii by machining or other methods, for example, a radius 17a of about 0.31R and 17b of about 0.12R. The ramp is situated intermediate the hose receiving end 11 and the hose abutment flange 15. On the "backside" of the ramp 17 there is formed an expansion area 19 formed between a backside 21 of the ramp and an area 23 on the nipple. The hose receiving end 11 of the nipple 1 has a further inclined portion 25 to assist in the sliding of a hose 27 onto the hose receiving end and reduce the stresses on the hose.

The grip segments 3 include a first node 29 which cooperates with the hose, ramp 17 and abutment flange 15 in a manner discussed below. A second annular node 31 cooperates with the hose 27, inclined portion 23 and the expansion area 19 providing a sealing ability, in addition to the sealing provided by the other cooperating elements of the coupling. The grip segments 3 further include an inwardly directed alignment flange 33.

Operation

In assembling the coupling, the hose 27 is slid onto the nipple over the inclined portion 25 at the hose receiving end 11. It is slid to abut against the hose abutment flange 15 as seen in FIG. 1.

Figure 2:
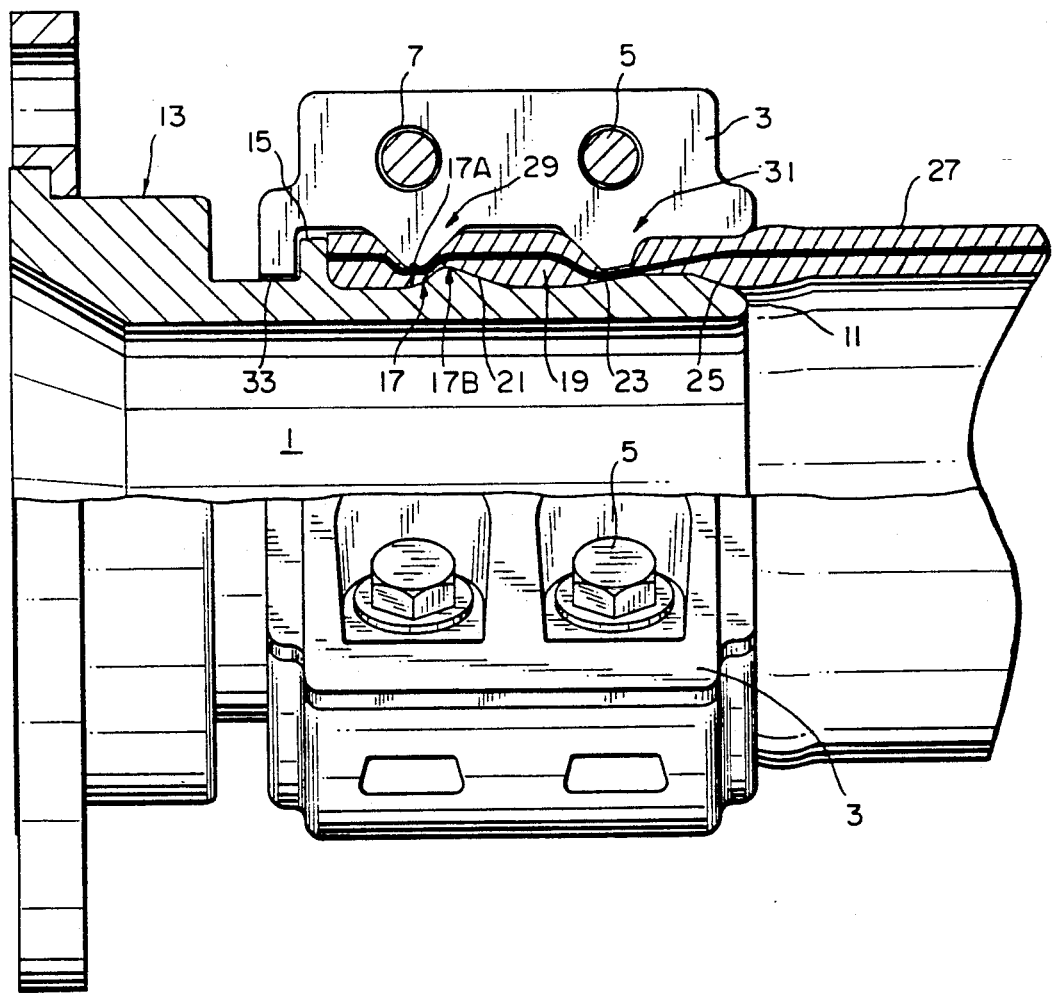
FIG. 2 is a side elevation view, partially in cross-section in a second position.
Figure 3:
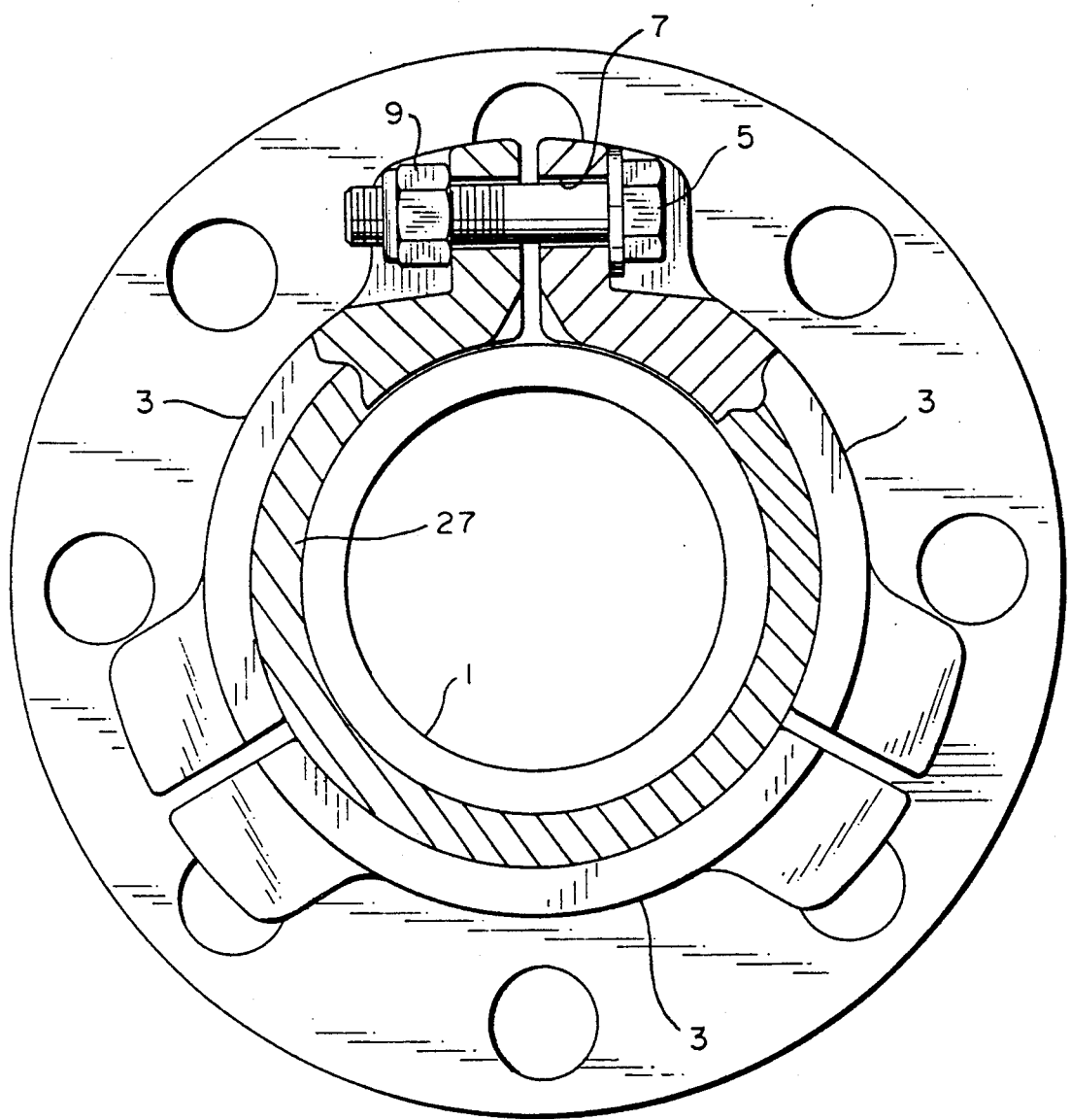
FIG. 3 is an end view, also partially in cross-section.

The grip segments 3 are placed around the hose, and the bolts 5 and nuts 9 are tightened. As the bolts 5 are tightened and the nodes 29 and 31 are depressed, the hose will conform to the ramp 17. Thus, the action of the ramp against the hose and against node 29 causes the gripping segments to push forward, creating a space 35 between the abutment flange 15 and the inward alignment flange 33 as seen in FIG. 1. The hose which is pushed out of the way over the ramp expands into the expansion area 19 wherein node 31 cooperates with inclined portion 23. The compression on the hose creates a tight seal. Under pressure or tension after the coupling is assembled, the nipple relationship between the hose and segments changes from the position in FIG. 1 generally and reaches that in FIG. 2 wherein the area 35 is sufficiently reduced.

It will be appreciated that the nipple, in effect, self-seeks its proper location on the ramp. As further seen in FIG. 2, node 29 is very closely abutted to ramp 17, and node 31 moves substantially up the inclined portion 23 between the expansion area 19 and the hose receiving end.

The self-tightening aspect requires low initial torque and maximum sealing.

While one embodiment of the invention has been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of aligning and tightening a hose coupling, comprising;
   a) providing a unitary nipple with a rearward hose receiving end and a forward hose coupling end;
   b) forming a hose abutment flange directed outwardly on the nipple remote from the hose receiving end;
   c) forming a pressure ramp on the nipple intermediate the hose receiving end and the hose abutment flange, and an inclined area on the nipple adjacent to the hose receiving end;
   d) providing a plurality of unitary grip segments with a hose receiving end and a coupling end, two nodes including a hose receiving end node, and an inwardly directed alignment flange;
   e) sliding a hose over the hose receiving end of the nipple toward the abutment flange;
   f) forming an expansion area by placing the grip segments over the hose with the inward alignment flange located between the outward abutment flange and the coupling end of the nipple, one node between the ramp and the abutment flange, and the hose receiving end node over the inclined area; and
   g) tightening the grip segments on the hose and nipple, forcing the grip segments toward the coupling end, forcing the hose receiving end node axially toward the inclined area and the hose receiving end, forcing the other node axially toward the ramp and squeezing the hose into the expansion area, without penetrating the hose.

2. The method of claim 1, including forming the ramp at an angle of about 45°.

3. The method of claim 1, including forming the ramp at an angle by forming two radii.

4. The method of claim 1, including locating one of the nodes closely adjacent to the ramp.

5. The method of claim 1, forming the inclined area and the node over the inclined area annularly.

6. The method of claim 1, forming the ramp and the node between the ramp and the abutment flange annularly.

7. The method of claim 1, wherein the hose conforms to the ramp as the segments are tightened.

8. The method of claim 1, including forming a further inclined portion adjacent to the hose receiving end of the nipple.

9. The method of claim 1, wherein the ramp is formed with an angle having two radii.

10. The method of claim 1, wherein the hose abuts the abutment flange.

11. A self-tightening hose coupling, comprising:
    a) a unitary nipple having a rearward hose receiving end and a forward hose coupling end;
    b) a hose abutment flange directed outwardly on the nipple located remote from the hose receiving end;
    c) a pressure ramp on the nipple located intermediate the hose receiving end and the hose abutment flange, and an inclined area on the nipple adjacent to the hose receiving end;
    d) a plurality of unitary grip segments having a hose receiving end and a coupling end, two nodes and an inwardly directed alignment flange therein;
    e) a hose positioned over the hose receiving end of the nipple having an end adjacent the abutment flange;
    f) the grip segments being positioned over the hose with the inward alignment flange located between the outward abutment flange and the coupling end of the nipple, one node between the ramp and the abutment flange, and the other node over the inclined area;
    g) the nodes, the pressure ramp and the inclined area defining an expansion area therebetween;
    h) means for tightening the grip segments on the hose and nipple, forcing the grip segments axially toward the coupling end by squeezing the hose into the expansion area, without penetrating the hose, forcing one node axially toward the ramp and the other node onto the inclined area toward the hose receiving end.

12. The coupling of claim 11, wherein the ramp is formed at an angle of about 45°.

13. The coupling of claim 11, wherein one of the nodes is closely adjacent the ramp.

14. The coupling of claim 11, wherein the inclined area and the node over the inclined area are annular.

15. The coupling of claim 11, wherein the ramp and the node between the ramp and the abutment flange are annular.

16. The coupling of claim 11, wherein the hose conforms to the ramp as the segments are tightened.

17. The coupling of claim 11, wherein the hose abutment flange and the alignment flange are annular.

18. The coupling of claim 11, wherein the ramp has an angle having two radii.

19. The coupling of claim 11, wherein the hose is positioned to abut the abutment flange.

20. A method of maintaining initial sealing and retention properties of a self-aligning and tightening hose coupling, comprising:
   a) providing a unitary nipple with a rearward hose receiving end and a forward hose coupling end;
   b) forming a pressure ramp on the nipple intermediate the hose receiving end and the hose coupling end, and forming an inclined area adjacent the hose receiving end;
   c) forming an expansion area by providing a plurality of unitary grip segments having a hose receiving end and a coupling end and a pair of nodes, one on each side of the ramp, one node adjacent to and corresponding with the ramp, and the other node adjacent to and cooperating with the inclined area;
   d) sliding a hose over the hose receiving end of the nipple toward the coupling end;
   e) placing the grip segments over the hose;
   f) placing an initial load on the hose by tightening the grip segments on the hose and nipple and thus forcing the grip segments toward the coupling end by squeezing the hose into the expansion area without penetrating the hose;
   g) placing pressure on the hose assembly creating an end load thereon, forcing one node axially toward the ramp and the other node axially toward the inclined area and the hose receiving end, and thereby repositioning the relationship between the nipple and the grip segments causing self-aligning and self-tightening the coupling.

21. Method of claim 20, including forming a hose abutment flange directed outwardly on the nipple remote from the hose receiving end;
   and providing an inwardly directed alignment flange on the grip segments; and
   wherein the grip segments are placed over the hose with the inward alignment flange located between the outward abutment flange and the coupling end of the nipple.

22. The method of claim 19, wherein the hose abutment flange and the alignment flange are annular.

23. The method of claim 20, including forming the ramp at an angle of about 45°.

24. The method of claim 20, including forming the ramp at an angle by forming two radii.

25. The method of claim 20, wherein the ramp and nodes are annular.

* * * * *